United States Patent [19]

Fox

[11] Patent Number: 5,050,537
[45] Date of Patent: Sep. 24, 1991

[54] AUTOMATIC ANIMAL FEEDING SYSTEM

[76] Inventor: Harvey Z. Fox, R.D. 3, Box 11A, Thorp, Wis. 54771

[21] Appl. No.: 517,185

[22] Filed: May 1, 1990

[51] Int. Cl.⁵ .............................................. A01K 5/02
[52] U.S. Cl. ............................... 119/51.02; 119/56.1; 119/57.6
[58] Field of Search ................... 119/51.02, 56.1, 56.2, 119/57.5, 57.6; 198/703, 706, 710; 414/350, 379, 380, 381, 382, 425

[56] References Cited

U.S. PATENT DOCUMENTS

| 1,056,523 | 3/1913 | Ferris | 414/382 |
| 1,113,738 | 10/1914 | Beane | 414/379 |
| 1,799,534 | 4/1931 | Riblet | 119/56.1 X |
| 2,615,424 | 10/1952 | Spickler | 119/57.6 X |
| 4,712,511 | 12/1987 | Zamzow et al. | 119/51.02 |

FOREIGN PATENT DOCUMENTS

| 2481234 | 10/1981 | France | 119/57.6 |
| 0662047 | 5/1979 | U.S.S.R. | 119/57.6 |
| 0760913 | 8/1980 | U.S.S.R. | 119/57.6 |
| 1323060 | 7/1987 | U.S.S.R. | 119/57.6 |

Primary Examiner—Robert P. Swiatek
Assistant Examiner—Todd E. Manahan
Attorney, Agent, or Firm—Berman, Aisenberg & Platt

[57] ABSTRACT

A feeding system for cows uses a track system which carries bowls in a first direction from each of the stalls in a stanchion type barn to a feeding room where the bowls are filled and back to the stalls. Each of the bowls is carried by a bracket and has a mechanism for allowing the contents of the bowl to be emptied into a feed trough associated with an individual stall. A one-way tripping mechanism adjacent each stall allows the bowls to pass freely when moving in said first direction and causes the bowls to be emptied when moved in the reverse direction. All the full bowls can be simultaneously emptied by moving them in the first direction to align them with the proper stalls and by then reversing the direction of movement of the track system.

21 Claims, 2 Drawing Sheets

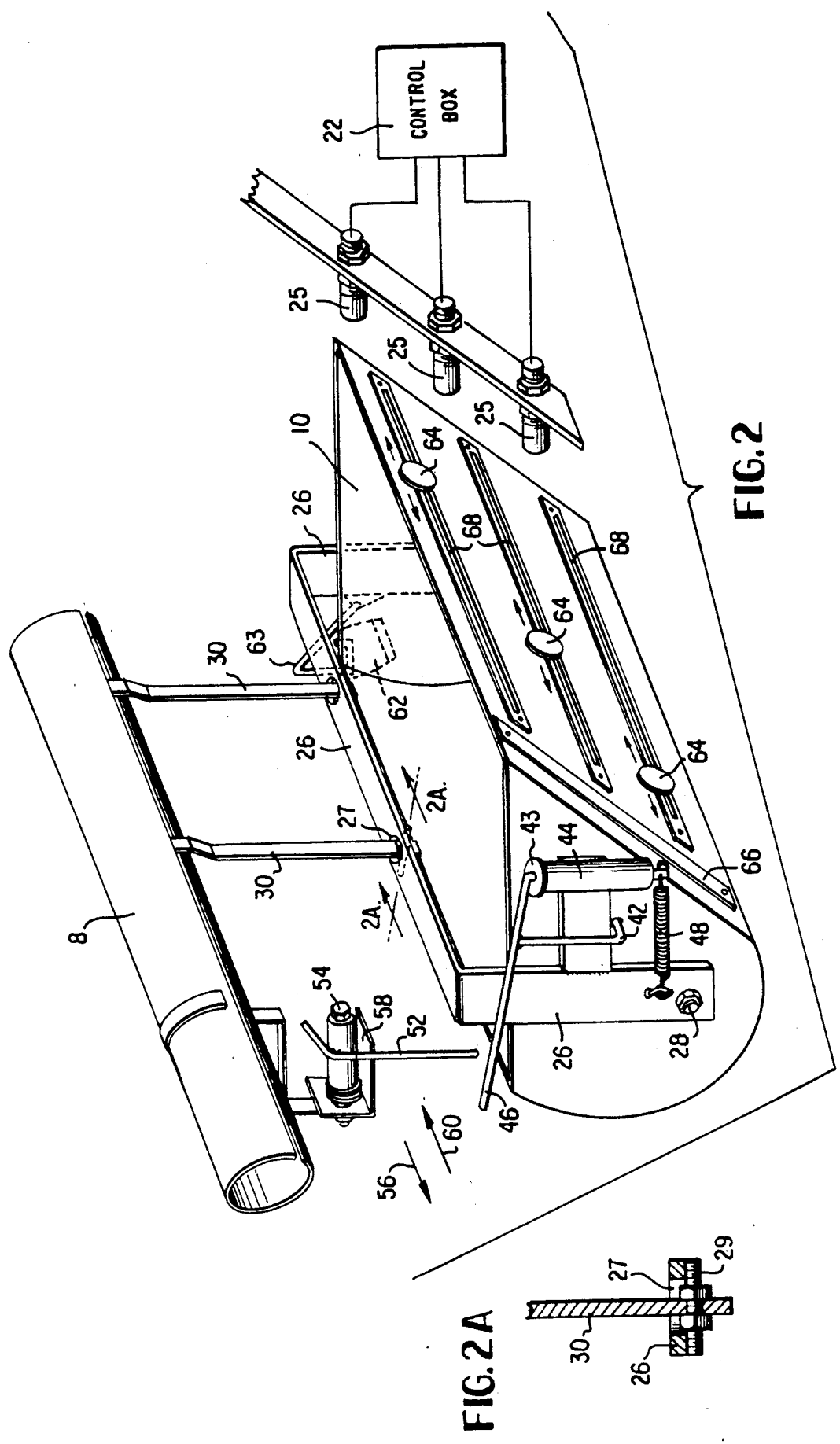

AUTOMATIC ANIMAL FEEDING SYSTEM

TECHNICAL FIELD

This invention relates to the art of feeding systems for animals. The invention is particularly useful for feeding a plurality of dairy cows in a dairy barn.

BACKGROUND ART

Automatic feeding systems are known wherein feed is automatically dispensed to animals in stalls in prescribed amounts. The particular amount to be dispensed can be determined for each individual animal in accordance with known criteria. Typically, each animal is identified by a tag carried by the animal, and the information on the tag is read by a known device. The information regarding the amount to be fed to each animal is stored in a computer, which identifies the animal from information provided by the tag reader and controls the feed dispenser to provide the correct amount. Examples of such a system are shown in U.S. Pat. Nos. 4,475,481 (Carroll) and 4,672,917 (Fox).

,Another prior art feeding system is shown in U.S. Pat. No. 4,712,511 (Zamzow et al.). According to this patent, a plurality of bowls are loaded with prescribed amounts of feed, and the feed is distributed to the animals. There are several disadvantages to the Zamzow et al system, however. For example, that system is electronically complicated and requires a significant amount of wiring to operate solenoids located at individual stalls for dumping the feed bowls.

Other systems, such as those shown in U.S. Pat. Nos. 3,156,215 (Barker); and 3,587,529 (Wienert) provide hoppers which move between stalls and dispense feed. Systems such as those shown by U.S. Pat. No. 2,914,023 (Pierre) use conveyors which supply feed to animals by pushing the feed toward openings in the conveyor.

SUMMARY OF THE INVENTION

In accordance with the invention, a track is arranged around a stanchion type barn to carry a plurality of feed bowls. Each bowl is associated with a single stall, and each bowl is carried from a respective stall to a feed room where it is loaded with a prescribed amount of feed. A tag is carried adjacent the bowl to identify the animal associated with the bowl, and the tag is read by a reader in the feed room. A computer can be programmed with the information necessary to provide each bowl with the optimum amount of feed.

If a computer is not used, the bowl can be provided with indicators which can be read by proximity sensors to indicate the amount of feed to be placed into the bowl. The positions of the indicators are adjusted by the operator in accordance with the needs of the particular animal.

The track is arranged to move the bowls in a first direction for carrying them to the feed room and back to positions adjacent the stalls. The bowls are emptied into individual troughs by reversing the direction of the track. Preferably, all of the bowls are emptied simultaneously by a single reverse movement whereby all of the feed is emptied into the troughs for consumption.

In the preferred embodiment, the system uses a continuous flow mixer which mixes the different types of feed supplied to the bowls as the feed is loaded. This prevents layering of the feed which allows the animal to eat selected types of feed.

BRIEF DESCRIPTION OF THE DRAWINGS

FIG. 2 is a perspective of a portion of a track and a single bowl in accordance with the invention.

FIG. 2A is a cross section taken along line 2A—2A of FIG. 2.

DETAILED DESCRIPTION OF THE PREFERRED EMBODIMENT

Figure 1:
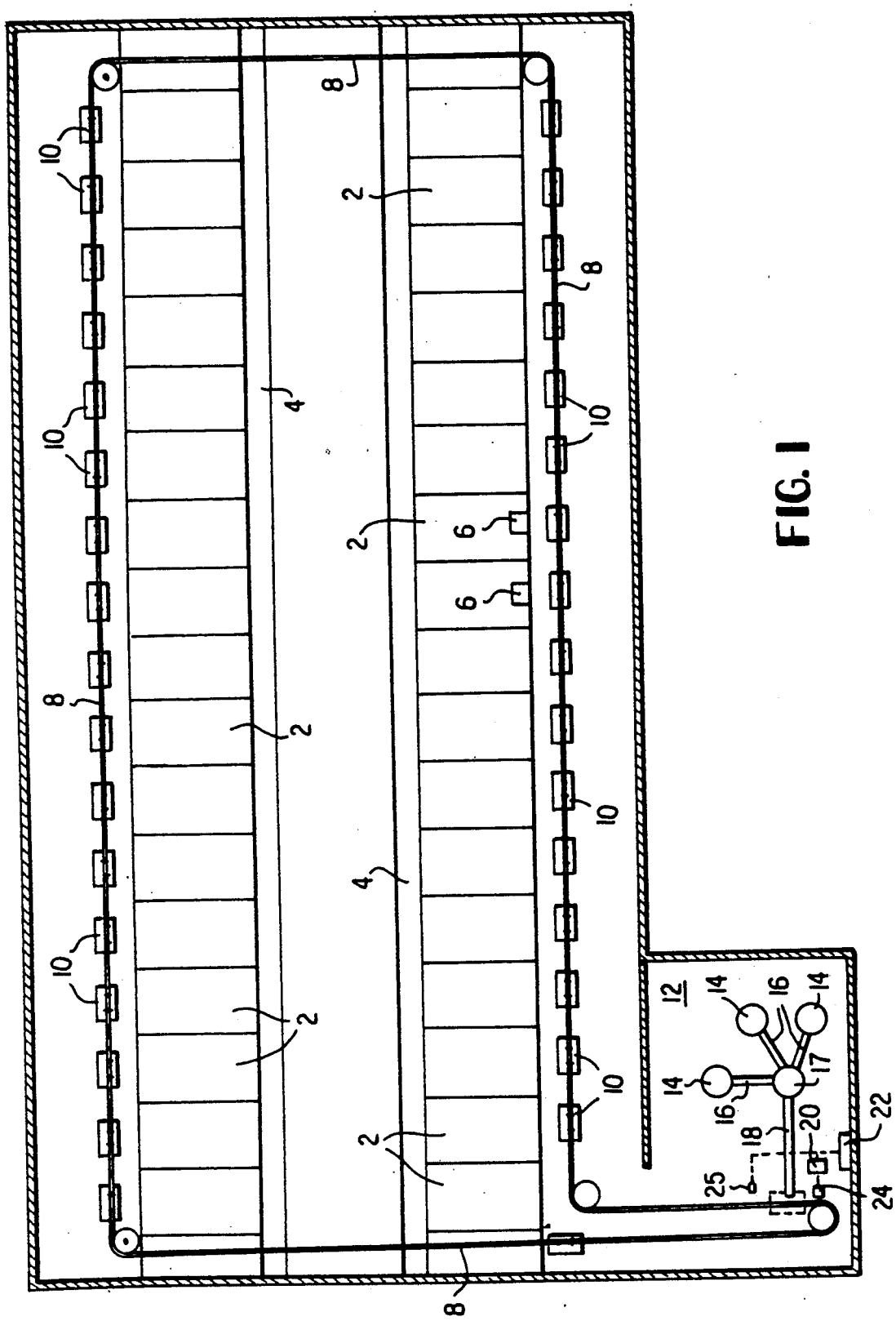
FIG. 1 is a plan of a stanchion type barn showing the feed system of the invention installed.

With reference to FIG. 1, a stanchion type barn includes a plurality of stalls 2, each of which is designed to accommodate an individual animal. The stalls are arranged such that waste gutters 4 extend along one end of the stalls, and each of the stalls has a feed trough 6 accessible to the animal in the stall.

A track 8 carries a plurality of bowls 10, each of which is associated with a respective one of the stalls 2. The track carries the bowls through a feed room 12 for loading the bowls with feed. The feed room includes a plurality of storage bins 14, each of which is supplied with a selected type of feed for the animals in the stalls. Metering apparatus 16 controls the flow of the feed to a conveyor 18 which directs the mixture of feed into a bowl when it stops in the feed room. A mixing device 17 mixes the feed from the metering devices 16 to provide a uniform mixture to prevent layering.

A computer 20, which may be located anywhere, controls the supply of the various types of feed to the bowls in accordance with known principles of animal management. The computer is electrically connected to a control box 22 which in turn controls the metering devices 16 and the conveyor 18 by known electrical control mechanisms. The feed room also includes a tag reader 24 which reads a tag associated with each bowl, identifies the animal associated with that bowl, and supplies the identification to the computer 20. The computer then causes the necessary feed for that animal to be loaded into the particular bowl through the control box 22.

FIG. 1 also shows an alternative wherein proximity sensors 25 are located adjacent the path of the bowls to detect indicia on each of the bowls which indicate the amount of feed to be loaded into that particular bowl. The proximity sensors are connected to the control box 22 which in turn controls the metering apparatus 16 to load the determined amounts of the feed into the bowl. This would be used in those instances when the computer 20 is not used to determine the amounts to be dispensed.

FIG. 2 shows the details of the preferred bowl arrangement. A bowl 10 is supported on a bracket 26 by pivot pins 28 such that when the bowl is pivoted, the contents of the bowl are emptied. Hangers 30 are attached to a movable track which is carried in the stationary outer track housing 8 by rollers (not shown). The bracket is attached to the hangers by a flexible mechanism shown in detail in FIG. 2A which allows the bowl to accommodate corners in the track.

FIG. 2A is a cross section along line 2A—2A of FIG. 2. Bracket 26 has an opening 27 therein which allows the hanger 30 to move horizontally with respect to the bracket 26. A rod 29 extends horizontally through the lower end of the hanger 30 and is secured to the hanger by two nuts. The length of rod 29 is greater than the diameter of the opening 27 so that the bracket 26 is supported by the rod 29. The same structure is used for both hangers 30.

The bowl is mounted to the bracket such that the center of gravity of the bowl is located to the left of an axis containing the pivot pins 28. The bowl is held in the upright position by the engagement between latch 42 and the sidewall of the bowl so that when the latch is released, the bowl automatically empties into a trough 6. The latch 42 is attached to a pin 43 which is carried in a support 44 which is in turn mounted to the bracket 26. One end of the latch 42 is positioned to engage the bowl 10, and an outer end of pin 43 comprises a trip arm 46. When the upper end of the trip arm 46 is rotated away from the bowl 10, the end of latch 42 is rotated out of engagement with the bowl to allow the bowl to tilt and thus to empty. A spring 48 extends between the end of the pin 43 which protrudes through the support 44 and the bracket 26 to bias the latch into engagement with the bowl. A spring (not shown) may be used to engage bracket 26 and bowl 10 to bias the bowl into an upright position.

A one way tripper 52 is pivotally mounted to the stationary portion of track 8 by a pin 54 at a location adjacent a selected stall 2. The one way tripper is mounted so that movement of the bowl in a forward direction as indicated by the arrow 56 causes the tripper to pivot away from a stop 58 when engaged by the trip arm 46 to allow the trip arm to pass without causing disengagement of the end of the latch with the bowl and consequent emptying of the bowl. This permits the bowls to be moved along the track to the feed room to load each of the bowls with feed and to return the bowls to positions adjacent the stalls.

When the bowls are located adjacent the proper stalls, the direction of the movable track is reversed to move in the direction of the arrow 60. This causes the trip arm 46 to engage the one way tripper 52 and to rotate the one way tripper into engagement with stop 58 which prevents further rotation of the one way tripper 52. This, in turn, rotates trip arm 46 in a direction away from the bowl, disengages the latch 42 from the bowl and allows the bowl to empty the feed into a trough 6 (FIG. 1). When the bowls are again moved in the forward direction 56, the bowl is brought to its upright orientation by the balance of the bowl or the action of a spring, and the latch 42 is brought into engagement with the bowl by spring 48. The bowls may then be moved along the track to the feed room 12 for reloading.

A tag 62 is also mounted to the bowl by hanging it on a hook 63. The tag identifies the animal which is associated with that particular bowl, and the tag is read by the tag reader 24 in the feed room. If the tag is not used, the movable buttons and proximity sensors described below being employed, the tag is simply removed from the hook on that bowl. If a particular installation is intended never to use a tag reader, the bowls may be supplied without hooks 63. The tag and tag reader are known and are commercially available.

If the tag and associated computer are not used, movable indicia are provided on the bowl to indicate the amounts of feed to be supplied to the bowl. In a preferred embodiment, three movable buttons 64 indicate the amount of each of three feed mixtures to be used. The location of each button indicates the amount of that particular feed, and a bar 66 indicates the base line for measuring the positions of the buttons. The bar and the buttons are preferably of metal, and proximity sensors 25 detect the passing of the bar 66 and the passing of each button. The velocity of the bowls is generally known, and the time taken for the bowl to travel from the bar 66 to a button 64 represents the position of the button and the amount of that particular feed to be loaded into the bowl. If the velocity is not generally known, one of the buttons can be placed at a standard position against which the positions of the other buttons are measured. The control box determines these amounts and directs the metering devices to provide the determined amount of feed.

In the embodiment shown, the buttons are held to the bowl by slotted plates 68 which are secured to the bowl by screws, or the like.

In operation, the bowls are all moved in the forward direction through the feed room whereby the bowls are loaded with prescribed amounts of feed in accordance with the requirements of a particular respective animal as determined by the computer from the tag reader or by the operator and reflected in the positions of the buttons. The forward movement of the bowls continues until the bowls are opposite the correct stalls, and the forward motion is then stopped. The bowls are then emptied by reversing the direction of the track so that the trip arms engage the one way trippers 52 which causes all of the bowls to empty into the troughs 6 simultaneously.

No drive means has been illustrated, it being understood that a variety of these exist and can be employed.

Modifications within the scope of the appended claims will be apparent to those of skill in the art.

I claim:

1. A feeding system comprising a plurality of feed bowl means for receiving and dispensing feed, track means for supporting said plurality of feed bowl means and for transporting said feed bowl means along a path, loading means for loading said feed into each of said plurality of feed bowl means, and means for emptying each of said feed bowl means; wherein said emptying means comprises trip arm means on each of said feed bowl means for causing said feed bowl means to empty when said trip arm means is tripped and a plurality of ripping means adjacent said path for allowing said plurality of feed bowl means to move along said path in a first direction without tripping said trip arm means and for tripping said trip arm means when said plurality of feed bowl means are moved along said path in a second direction.

2. A feeding system according to claim 1 wherein said each of said feed bowl means comprises a bracket attached to said track means and pivotally supporting a bowl.

3. A feeding system according to claim 2 wherein said trip arm means is mounted to said bracket and comprises a pivotally mounted latch which is moved from engagement with said bowl when said trip arm means is tripped.

4. A feeding system according to claim 1 further comprising a plurality of identification means for cooperating with said loading means to cause a selected amount of said feed to be loaded into each respective one of said plurality of feed bowl means.

5. A feeding system according to claim 4 wherein said identification means comprises a tag which moves with said bowl means and carries information regarding an animal associated with said bowl and tag reader means for reading said information.

6. A feeding system according to claim 4 wherein said identification means comprises a movable element which is movable with respect to said bowl for indicating the amount of a particular feed to be loaded into said bowl.

7. A feeding system according to claim 6 wherein the position of said movable element indicates the amount of said particular feed.

8. A feeding system according to claim 7 further comprising means for indicating a base line for measuring the position of said movable element.

9. A feeding system according to claim 8 comprising a plurality of said movable elements.

10. A feeding system according to claim 9 wherein said identification means further comprises proximity sensor means for determining the presence of said movable elements and of said means for indicating a base line.

11. A feeding system according to claim 1 wherein said loading means comprises means for mixing a plurality of types of feed prior to loading said plurality of types of feed into said feed bowl means.

12. A feeding system according to claim 11 wherein said means for mixing comprises a continuous flow mixer.

13. A feeding system according to claim 1 further comprising a plurality of animal stalls for receiving an animal to be fed, each of said tripping means being associated with a respective one of said plurality of animal stalls.

14. A feeding system according to claim 1 wherein each of said feed bowl means comprises a bowl, a bracket, means for supporting said bowl on said bracket, latch means for maintaining said bowl upright when said bowl has said material therein, and said trip arm means for operating said latch to allow said bowl to rotate to dispense said material.

15. A feeding system according to claim 14 further comprising identification means comprising a movable element which is movable with respect to said bowl for indicating the amount of a particular feed to be loaded into said bowl.

16. A feeding system according to claim 15 wherein the position of said movable element indicates the amount of said particular feed.

17. A feeding system according to claim 16 further comprising means for indicating a base line for measuring the position of said movable element.

18. A feeding system according to claim 17 comprising a plurality of said movable elements.

19. A feeding system according to claim 18 wherein said identification means further comprises proximity sensor means for determining the presence of said movable elements and of said means for indicating a base line.

20. A barn for feeding animals comprising a plurality of stalls for receiving animals, a feeding system comprising a plurality of feed bowl means for receiving and dispensing feed, track means for supporting said plurality of feed bowl means and for transporting said feed bowl means such that each of said feed bowl means is adjacent a respective one of said plurality of stalls, loading means for loading said feed into each of said plurality of feed bowl means, and means for emptying each of said feed bowl means, wherein said emptying means comprises trip arm means on each of said feed bowl means for causing said feed bowl means to empty when said trip arm means is tripped and a tripping means adjacent each of said stalls for allowing said plurality of feed bowl means to move along said path in a first direction without tripping said trip arm means and for tripping said trip arm means when said plurality of feed bowl mans are moved in a second direction.

21. Apparatus for determining the amount of each of a plurality of materials to be placed in means for containing said plurality of materials comprising, a plurality of movable elements, each of said movable elements being movable with respect to said means for containing for indicating by its location the amount of a respective one of said plurality of materials to be loaded into said means for containing, stationary means fixed with respect to said means for containing for providing a base line position for measuring the position of each of said movable elements with respect to said base line, proximity sensor means for determining the presence of said movable elements and of said stationary means, and means for determining the distance between each of said movable elements and said stationary means.

* * * * *